Dec. 31, 1963 D. A. HARTLEY ETAL 3,115,740
DEVICE FOR GATHERING NUTS, FRUIT AND THE LIKE
Filed Aug. 3, 1962
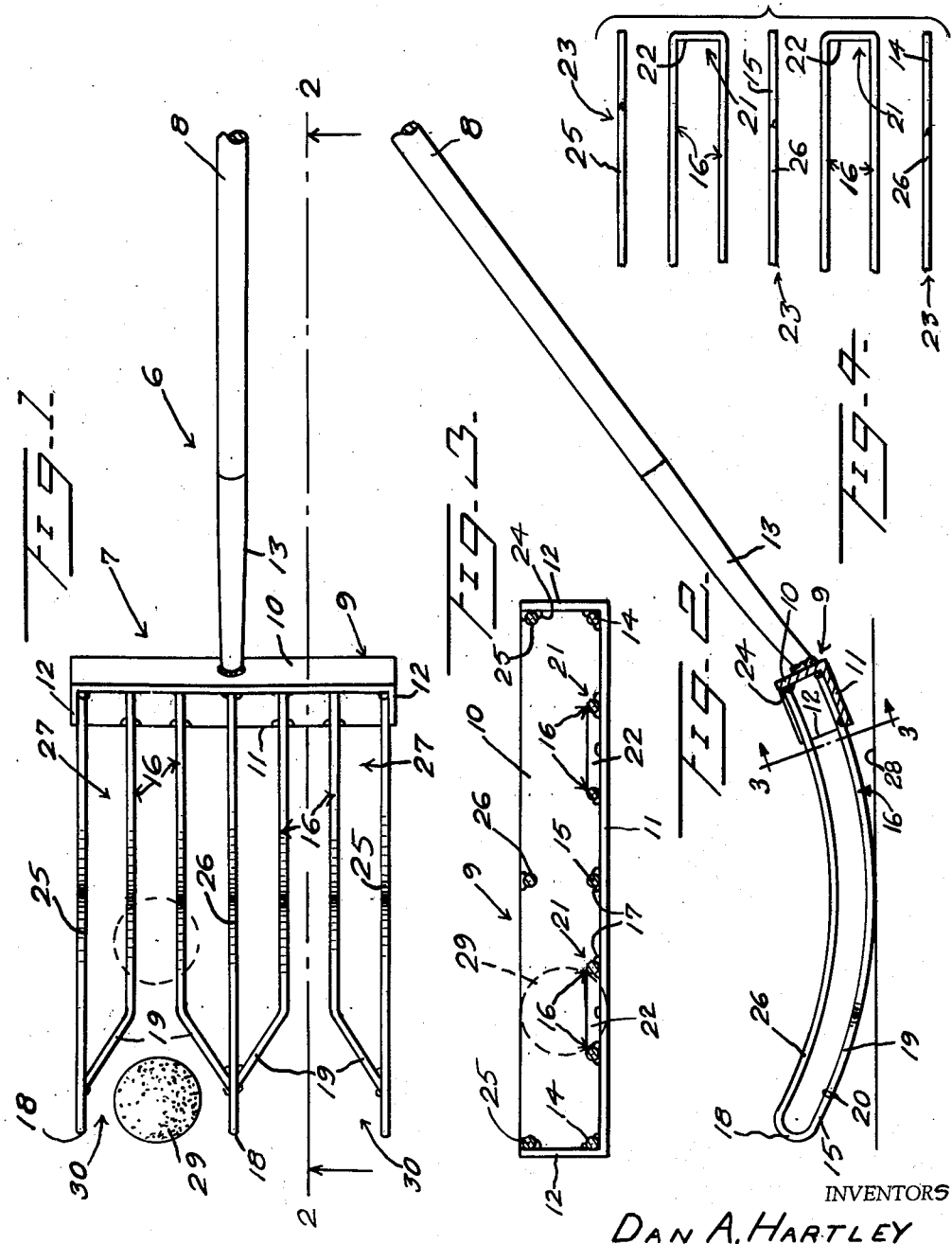
INVENTORS
DAN A. HARTLEY
PAUL ALBERTI
BY
ATTORNEY 3,115,740
DEVICE FOR GATHERING NUTS, FRUIT AND THE LIKE
Dan A. Hartley and Paul Alberti, both of Rte. 2, Stockton, Mo.
Filed Aug. 3, 1962, Ser. No. 214,680
1 Claim. (Cl. 56—328)

This invention relates to a manually operated tool or implement for gathering fruits and nuts which are lying on the ground and which may be manipulated by an operator from an upright standing position to thereby substantially lessen the labor normally involved in gathering or harvesting such items.

Another object of the invention is to provide a tool or implement for the aforedescribed purpose the head of which may readily travel over rough or uneven ground and through grass, weeds, and similar growths for collecting the fruits or nuts, and which head is so constructed that dirt, small stones and other debris may readily escape therefrom.

Various other objects and advantages of the invention will hereinafter become more fully apparent from the following description of the drawing, illustrating a presently preferred embodiment thereof, and wherein:

FIGURE 1 is a fragmentary plan view of the gathering tool;

FIGURE 2 is a longitudinal sectional view thereof taken substantially along a plane as indicated by the line 2—2 of FIGURE 1;

FIGURE 3 is an enlarged cross sectional view through the tool head, taken substantially along a plane as indicated by the line 3—3 of FIGURE 2, and FIGURE 4 is a fragmentary plan view of parts of the tool head.

Referring more specifically to the drawing, the gathering tool or implement in its entirely is designated generally 6 and includes a fork-like head, designated generally 7, and a long handle 8.

The head 7 includes an elongated rigid heel member 9 which is disposed transversely of the tool 6 and which extends from side-to-side of the head 7. The heel member 9 includes a rear wall 10, a bottom wall 11 which extends forwardly from the bottom edge of the rear wall 10, and end walls 12. An inner end of the handle 8 is secured in a conventional manner in a socket 13 which is fixed to and extends upwardly and rearwardly from the heel member 9, midway between the end walls 12 thereof.

The tool head 7 includes tines 14, 15 and 16 which are secured to and extend forwardly from the heel member 9, each of said tines being connected to the upper side of the bottom wall 11, as by soldering, or weld as seen at 17. The two tines 14 are also disposed against and secured to the inner sides of the end walls 12. The tine 15 is disposed midway between the tines 14 and said tines 14 and 15 are disposed parallel to one another and are uniformly bowed longitudinally thereof, as seen in FIGURE 2, so as to have convex undersides. The tines 14 and 15 are of of the same length and have corresponding upwardly curved and rounded forward ends 18, as seen in FIGURE 2. A pair of the tines 16 are disposed on either side of the intermediate tine 15 and in equally spaced apart relationship to one another and to the tine 14 and the tine 15 between which said tines 16 are disposed. The tines 16 are shorter than the tines 14 and 15 and have forward end portions 19 which are flared or extend in diverging relation to one another. One of said flared tine portions 19 of each pair of tines 16 merges with and is secured to the tine 14, and the other divergent tine portion 19 is secured to the tine 15, said tine portions 19 being secured as by soldering, or weld as seen at 20, to the tines 14 and 15 inwardly or rearwardly of their upturned forward ends 18. The tines 16, including their flared forward portions 19, are longitudinally bowed to conform to the curvature of the tines 14 and 15.

Each pair of tines 16 is formed from a single length of rod or heavy gauge wire 21, as best seen in FIGURE 4, an intermediate portion 22 of which extends between the inner ends of the tines 16 thereof and which is disposed against the inner or forward side of the rear wall 10, as seen in FIGURE 3. Each of the longer tines 14 and 15 preferably comprises approximately a half of a length of rod or heavy gauge wire 23, the other half of which extends rearwardly from the upturned forward end 18 of said tine and is secured at its terminal as by soldering or welding 24 to the rear wall 10, near its upper edge. The rearwardly extending rod portions which are disposed above the side tines 14 constitute side wall members 25, and the upper portion of the intermediate rod 23, which is disposed above the intermediate tine 15, constitutes a partition wall member 26. Said wall members 25 and 26 are curved longitudinally so as to be disposed substantially concentric with the tines 14 and 15.

Each pair of tines 16 in combination with the tines 14 and 15 and the wall members 25 and 26, between which said pair of tines 16 are disposed, forms a collecting container or receptacle 27. The containers or receptacles 27 have open forward ends, open tops, rear ends closed by the heel member 9, and bottoms of openwork construction each composed of a pair of tines 16 and portions of the tines 14 and 15 between which said tines 16 are disposed.

The tool or implement 6 is operated by the user grasping the outer end of the handle 8 while standing in an upright position so that the undersides of the tines 14, 15 and 16 rest upon the ground 28 approximately midway of the ends of the head 7, as seen in FIGURE 2. The tool or implement 6, positioned as seen in FIGURE 2, is pushed from right to left with the head 7 sliding on the convexly rounded undersides of the tines. Items 29, such as fruits or nuts, lying upon the ground will be gathered by the tool 6 and collected in the containers 27 as the tool is advanced. Said items will enter the open forward ends or mouths 30 of the containers 27, defined by the upturned forward tine ends 18, and will thereafter contact one of the upwardly inclined flared tine portions 19 and will be deflected thereby toward the other tine portion 19 of the same receptacle 27, so that the item 29 will ride up onto the pair of tines 16 to thus be collected in the concave container 27. Sticks, small stones and other foreign matter entering the containers 27 will escape therefrom between the tines thereof. However, the tines 14, 15 and 16 of each container 27 are spaced apart a distance so that the items 29 being collected cannot escape from the containers therebetween. The tool 6 can be readily picked up and the head 7 inverted for discharging the collected items 29 from the containers 27 into a suitable collecting receptacle, not shown. It will be readily apparent that the tool head will readily pass over rough ground and through grass, weeds and other vegetation. The handle 8 may be raised slightly from its position of FIGURE 2 for rocking the head 7 counterclockwise so as to lower the flared tine portions 19 to enable smaller items 29 to be more readily picked up on the tines 16. The tool 6 is adapted for use in gathering nuts such as black walnuts, pecans, English walnuts and almonds, and fruits such as apples, oranges, lemons, prunes and plums. The size of the head 7 and the spacing between the tines thereof may be varied depending upon the size of the fruits or nuts to be gathered.

Various modifications and changes are contemplated and may be resorted to, without departing from the function or scope of the invention as hereinafter defined by the appended claim.

What we claim as our invention:

A long handle gathering tool having a fork-like head including a rigid transversely disposed heel member, a first set of elongated U-shaped rods disposed in transversely spaced relation to one another and having end portions secured to the heel member, each of said rods including a lower flight forming a tine, an upper flight forming a retaining wall and a rounded intermediate portion connecting the tine and wall remote from the heel member, a second set of U-shaped rods having intermediate portions secured to the heel member and substantially parallel end portions extending forwardly from said heel member, said end portions of each rod of the second set of rods being disposed between two adjacent tines and having flared terminals secured to said tines near to but spaced from said rounded intermediate portions thereof, said end portions of the rods of said second set of rods being disposed substantially coplanar with the tines, said head being longitudinally bowed from end-to-end thereof to provide a convex underside and a concave upper side, and said rods of the first set and second set being supported solely by their connections to the heel member and to one another to provide transversely spaced gathering compartments of openwork construction each having an open forward end and a top portion which is open from end-to-end thereof.

References Cited in the file of this patent

UNITED STATES PATENTS 2,864,228     Griffith _____ Dec. 16, 1958